Nov. 5, 1968    L. T. NERGE    3,409,360
FILMSTRIP PRODUCING DEVICE
Filed Oct. 12, 1965    2 Sheets-Sheet 1

INVENTOR.
LOWELL T. NERGE
BY
Dugger Johnson & Westman
ATTORNEYS

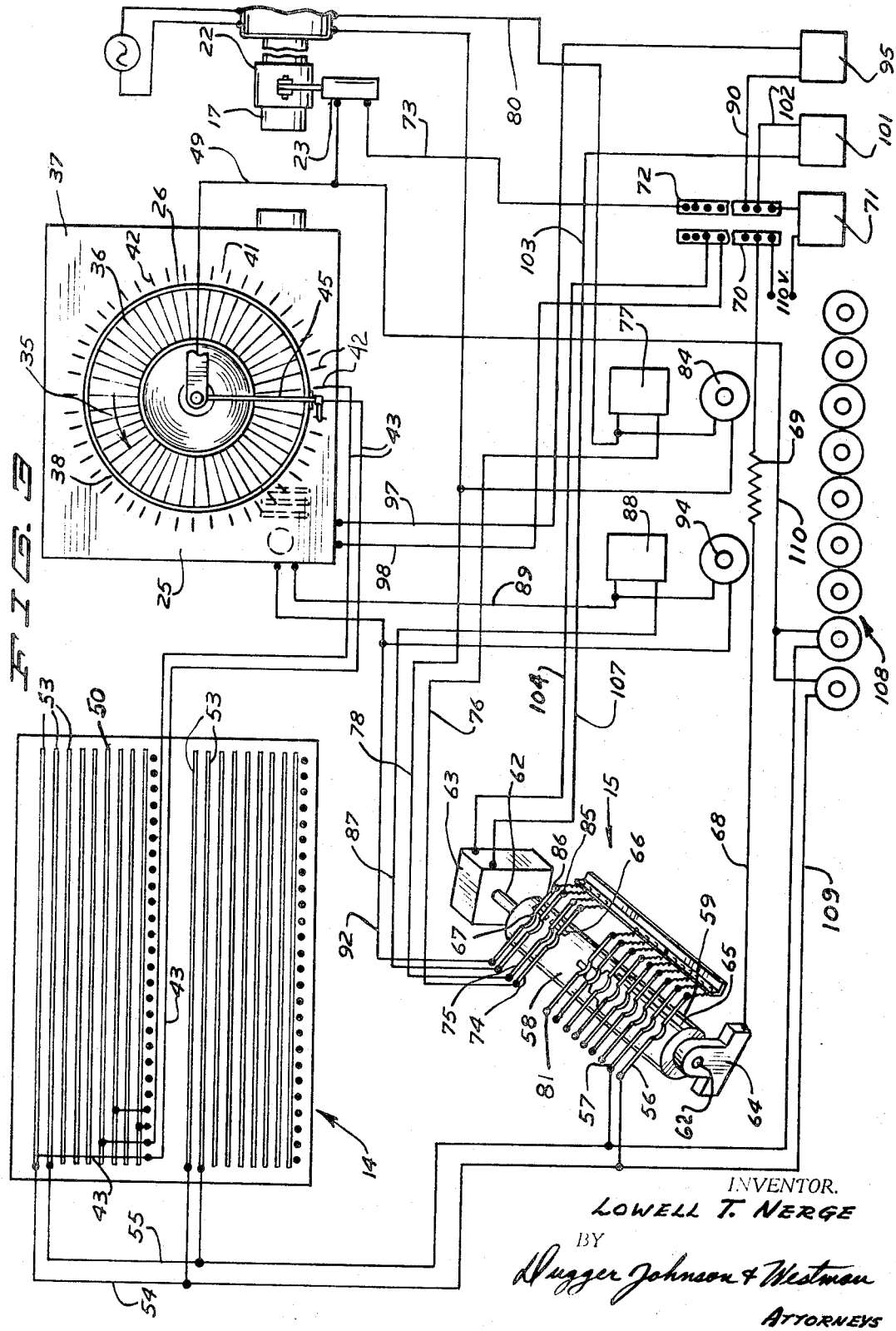

United States Patent Office 3,409,360
Patented Nov. 5, 1968

3,409,360
FILMSTRIP PRODUCING DEVICE
Lowell T. Nerge, Becker, Minn. 55308
Filed Oct. 12, 1965, Ser. No. 495,175
10 Claims. (Cl. 355—42)

ABSTRACT OF THE DISCLOSURE

A device for making a plurality of identical filmstrips from a preselected number of slides including a magazine for holding the slides in order and which can be cycled continuously so that the slides will appear sequentially and repetitively at an exposure station. A filmstrip camera is positioned to photograph the slide at the exposure station. The device includes means to program the camera's exposure for each individual slide so that when that slide again appears at the exposure station, it will be exposed identically onto the filmstrip for each of the plurality of filmstrips made. In this manner, slides having different densities can be properly copied onto a filmstrip with several uniform quality filmstrips being produced automatically after the first programming.

---

The present invention has relation to a device for producing filmstrips and more particularly to a unit which can be used for producing filmstrips from colored slides, in particular, and which can be programmed so the film is properly exposed for each frame and that the exposure necessary for each slide will be repeated when subsequent filmstrips are produced.

At the present time, there are devices which can be used for making filmstrips from color slides automatically, but these devices require the making up of a master strip and then automatically producing a large number of copies from the master. This involves a good deal of time and expense in producing the master and is economical where there are a large number of filmstrips to be made.

Another common method of filmstrip production is to individually expose each slide to produce a strip and then repeating the process for any additional strips that are necessary. This process is extremely slow and can be used only when one or two filmstrips are to be used. The quality between filmstrips can also vary greatly when each slide is individually copied onto the filmstrip.

The device of the present invent ion presents a new combination for programming colored slides which can be copied onto a film and made into filmstrips and is usable where an intermediate number of filmstrips are necessary. It is preprogrammed for the first filmstrip and after that the film will be automatically exposed the proper length of time for each slide for proper production of the filmstrips. It is not a high speed operation which requires a great deal of time and expense in setting up a master, but rather operates on the preprogramming principle so that repeatability of the exposure time necessary to copy each of the slides is easily attained and economically achieved. The construction of the mechanism is relatively simple using standard components in a new combination and this results in an inexpensive device.

Therefore, it is an object of the present invention to present a filmstrip producing device which has means for programming the proper exposure of the film on which the strip is produced for each of the individual slides from which the strip is produced.

In the drawings:

FIG. 3 is a part schematic diagram of the complete device of FIG. 1 including an electrical circuit diagram thereof.

Figure 1:
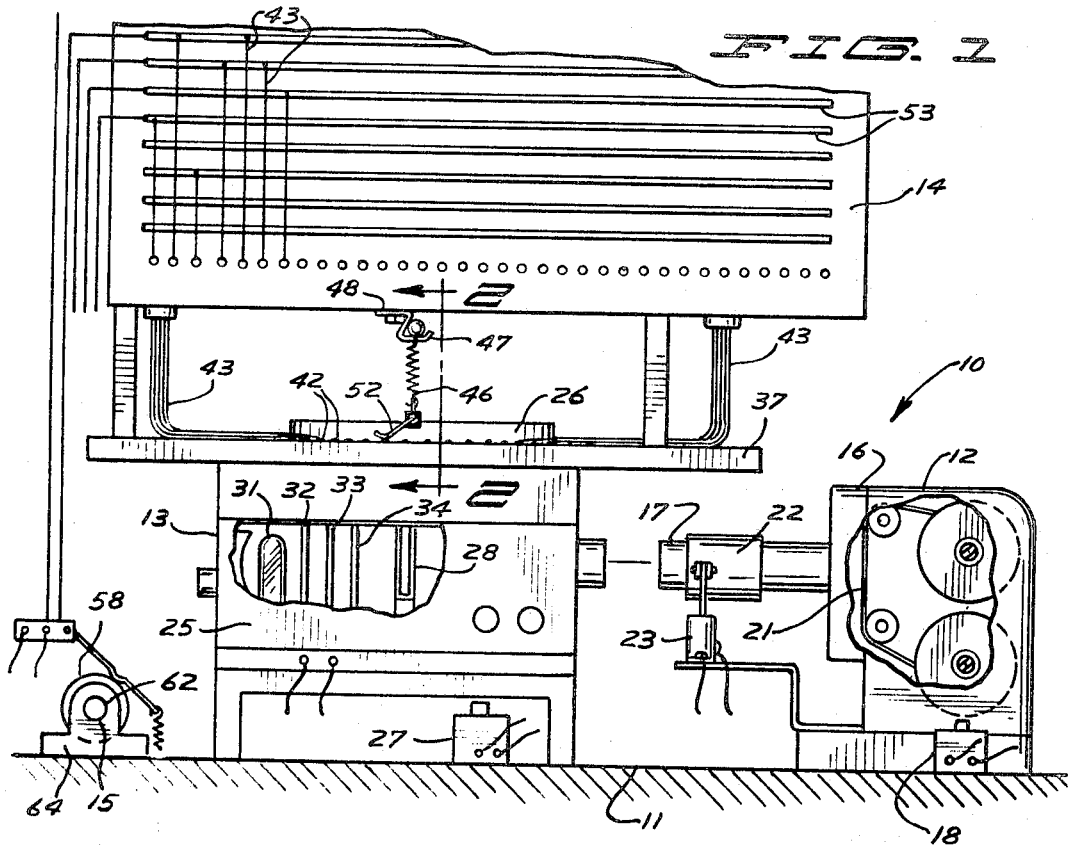
FIG. 1 is a part schematic view of a filmstrip producing assembly made according to the present invention.
Figure 2:
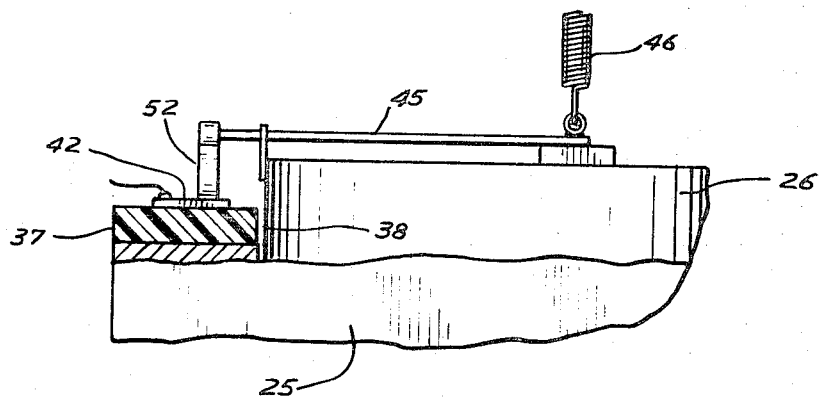
FIG. 2 is a fragmentary enlarged view of a contact assembly utilized with the device of the present invention and taken as on line 2—2 of FIG. 1.

Referring to the drawings and the numerals of reference thereon, the device assembly illustrated generally at 10 is comprised as a common support illustrated schematically at 11 which mounts a filmstrip camera 12, a slide changer with illuminator illustrated at 13, a control board 14, a timer 15, and suitable electrical controls, which are shown schematically in FIG. 3.

The filmstrip camera is of conventional design available on the market, and has a housing 16 in which film which is to be exposed to make the filmstrip is located and mounted. The housing is attached directly to the camera which has a forwardly projecting lens and shutter assembly illustrated generally at 17. The film inside the housing 16 is advanced through electrically operating film advance illustrated generally and schematically at 18. The solenoid operated film advance is also a conventional unit and is made to advance the film inside the housing 16 one frame each time the solenoid is tripped. The mechanism is shown schematically, because it is commercially available, and the film inside the camera is shown only in the fragmentary view in FIG. 1 and is indicated at 21. Suitable take up and supply rolls are provided. Backs are available for a filmstrip camera which will hold 100 feet of film so that several filmstrips can be made without changing the back on the camera or changing film.

The filmstrip camera 12 also has a solenoid controlled shutter 22. The solenoid 23 is operated in conventional manner and will trip the shutter when the solenoid is energized. The solenoid will control the shutter so that it can be held open for the length of time for which the solenoid is energized. This will be more fully explained as the description proceeds.

The slide changer and illuminator assembly illustrated generally at 13 includes a housing 25 which has a rotatable magazine 26 which rotates about a vertical axis and which will, through the operation of a control unit illustrated schematically at 27, place one slide at a time from the magazine into a slide illumination station illustrated also schematically and generally at 28. The magazine holds up to 80 slides, as shown. In the illumination station the slide which is being photographed or placed onto the film 21 of the filmstrip camera is aligned with a strong lamp 31 which will illuminate the slide in station 28 so that when the shutter 22 is opened, the image from the slide will be projected through the lens-shutter combination 17 and onto the filmstrip film 21 so that the image is captured on the film 21. The slide changer assembly 13, as shown, is basically the same as a slide projector marketed under the trademark Kodak Carousel, with the projection lens removed. In addition, suitable brackets are installed in the frame 25 for holding a heat absorbing glass 32, opalized glass 33 and a station for color correction filters 34, if they should be necessary. The magazine is the same as on the Kodak Carousel projector, as is the illumination station, which corresponds to the projection station in the Kodak Carousel projector. The mechanism for removing the slides from the magazine and placing them back into the magazine and advancing the magazine is the same as on the Kodak Carousel projector and is operated through the control unit shown schematically at 27, which is also an integral part of this projector. However, again, it is to be reminded that the lens has been removed and the illumination lamp is of the proper size for obtaining good images on the film in the filmstrip camera.

As can be seen in FIG. 3, the magazine section 26 has pockets 36 for slides and rotates in direction as indicated by the arrow 35 and advances one of the pockets at a time.

A flat frame plate 37 is mounted on top of the main frame 25 for the slide changer and it has an opening 38 which is of size to permit the magazine 26 to rotate inside the opening. The peripheral edge portions 41 of the frame plate 37 surrounding the opening are provided with a plurality of electrical conductor contacts 42, spaced around the periphery of the magazine and mounted onto the frame 37 so that there is one contact corresponding to each of the slide pockets 36. These contacts are individually connected to lead wires. The contacts are insulated from each other. Typical lead wires are shown at 43 and only two are shown for the sake of clarity. It is to be understood that lead wires are connected to each of the contacts however.

An electrical conductor rod 45 is mounted on and rotates with the magazine 26. The conductor rod extends into the center of the magazine and at the axis of rotation of the magazine is connected to an electrically conductive spring 46 which extends upwardly and is mounted through a rotating ball joint assembly 47 (which is also electrically conducting) to a bracket 48 that in turn is connected to an electrical conducting line 49. The line 49 is electrically connected to one contact of solenoid 23.

At the outer end of the contact arm or rod 45 a small spring loaded electrically conducting clip 52 is also mounted. The clip 52 extends outwardly and resiliently engages the frame 37 and rides over the contacts 42 when the magazine 26 is rotated. The contact arm 45 is positioned so that the clip or finger 52 is resting on a contact 42 whenever a slide is properly positioned in the illumination station 28. Thus there is an electrical contact made from line 49 through the connection described including bracket 48, ball joint 47, spring 46, contact arm 45 and finger 52 to one of the contacts 42 and thus to its connected line or wire 43.

As shown, the line 49 is connected to one terminal of the solenoid 23 used to operate the shutter of the filmstrip camera. As stated before, the length of time that the solenoid 23 is energized determines the length of time that the shutter of the filmstrip camera is open and thus the length of time of exposure of the film in the filmstrip camera.

Each of the lines 43 is passed through the control board 14 and has a terminal clip at the end thereof. The terminal clips are shown only schematically in FIGS. 1 and 3. The control boards 14 are provided with a plurality of bus bars 53 mounted thereon. As shown, there are nine bus bars in each bank on the control boards. Each of the bus bars in each bank is connected through a separate line, for example lines 54 and 55 to a contact arm, for example 56 and 57, of the timer assembly 15.

The timer assembly, as shown, comprises a rotating roll 58 which is made of an insulating material and is clad in particular areas with an electrical conducting material 59, such as aluminum. The roll is mounted onto stub shafts 62 and driven from a timer motor 63 which rotates the roll at a predetermined number of revolutions per minute. As shown, a 10 r.p.m. gear motor is used for rotating the shafts 62 and insulating roll 58. The covering 59 of the electrical conducting material is cut in steps so that it extends around the periphery of the insulating roll 58 a predetermined distance. For example, at the end of the roll shown adjacent a bearing block 64 the covering 59 extends substantially all the way around the insulating roll. There is a space 65 even at this junction so that the contact arm 56 momentarily interrupts contact with the electrically conducting material 59 during each revolution of the insulating roller 58. As shown, the number of steps on the covering 59 is nine and by controlling the portion of each revolution that the contact arm contacts the covering, the length of time of electrical conduction through this circuit can be controlled. There are nine steps in the present design shown ranging from one-fourth of a second to six seconds. With a 10 r.p.m. motor, it makes a revolution every six seconds so that the contact arm 56 would be making a connection for substantially six seconds, with a short break in the six second interval. The shorter times are achieved by placing the aluminum covering only a short distance around the periphery of the roll.

In addition, two small pieces, 66 and 67 of electrical conducting material are attached to the insulating roll adjacent the gear motor and these small strips are aligned longitudinally with the gap 65. The small strips are used for operating the film advance and the slide magazine advance.

As will be more fully evident, the shutter solenoid 23 to the filmstrip camera is energized when an appropriate electrical circuit is made through the timer assembly. However, when there is no connection through the timer, then the solenoid 23 is not energized, the shutter is closed and the film can be advanced as well as the slide changer being advanced one slide.

An electrically conducting pin is connected to the covering 59 and extends inwardly to connect to the stub shaft 62 adjacent the bearing block 64. The two stub shafts are insulated from each other by roll 58. An electrical connection is made from the stub shaft through the bearing block 64 to line 68 as well. Any preferred type of electrical connection can be made from the covering 59 to line 68 such as slip ring connections or the like. Line 68 is connected through a dropping resistor 69 to a conductive terminal block 70 that in turn is connected to one side of a 110 volt source. A second side of the 110 volt source is connected through a main power on-off switch 71 to a second conductive terminal block 72. A line 73 is connected from this second terminal block 72 to the opposite contact of solenoid 23 from the line 49. Thus, when the switch 71 is on and the connection is made through one of the lines 43 to a bus bar 53 and then through the line 54 to the contact arm of the timer and then through the covering sheet 59 and line 68, a circuit is completed to energize solenoid 23. The length of the time that the solenoid is energized will depend upon the particular contact arm of the timer in the circuit. For example, if the arm 56 is used the length of time that the shutter would be open and solenoid 23 energized would be approximately six second, less the small time that it takes to rotate past the open space 65. If the end contact arm 81 was connected in the circuit the solenoid 23 would be energized for only one-fourth of a second and the shutter would only be open for this one-fourth of a second.

The control 18 for the film advance of the filmstrip camera is automatically operated through a pair of wiper arms 74 and 75 which are positioned to simultaneously contact the strip 66. When they do contact the strip 66 a circuit is completed between the two arms. The arm 74 is connected through a line 76 to a cutout switch 77 which can be used for cutting out the automatic film advance operation and this switch in turn is connected through line 80 to a first control terminal on the film magazine. When the switch 77 is "on" the line 76 is connected to line 80. The other arm 75 is connected through a line 78 directly back to a second control terminal for the film advance. When the cutout switch 77 is in its "on" position and the circuit is completed through the arm 74 and 75 and strip 66, the control for the magazine will be energized and the film in the filmstrip camera will advance one frame. When the cutout switch 77 is in its "off" position the automatic operation is cut out and the only way that the control for advancing the filmstrip can be operated is by pressing a manual push button 84 which will actuate the control. The push button switch 84 is connected into the lines 78 and 80. The magazine advance receives power from a power source and the controls and connections are internal. A 35 mm. electric magazine, Model 135ES11 sold under the trademark "Camerz" by Photo-Control Corporation, Minneapolis, Minn., will operate satisfactorily. This has the electric connections as shown, and upon closing a control switch the magazine advances one frame.

Another pair of contact arms 85 and 86 are mounted on the timer assembly and will complete a circuit through the contact strip 67 when it is properly positioned. These contact arms 85 and 86 are used to control the control unit for changing the slides in the illumination station. The advance is operated by control unit 27. The arm 85 is connected through a line 87 to one side of the cut out switch 88. The other terminal cut out switch in turn is connected back through a line 89 to a terminal of the control unit on the slide changer. The contact arm 86 is connected through a line 92 to the other terminal of the control unit 27. The connections to power for the control unit are internal in the Carousel Projector. The controls described replace the normal remote push button supplied with the Carousel controlling forward motion of the changer. When the switch 88 is in its "on" position the automatic operation is in order (the line 87 is connected to line 89) and when the strip 67 completes the circuit between arms 85 and 86, the control unit 27 is energized to remove a slide from the illumination station, advance the slide magazine 26 one notch and place a new slide in the illumination station. When the switch 88 is in its "off" position the automatic operation of the changer is shut off. The control unit 27 can also be operated by closing a manual push button switch 94 which will complete the circuit to energize the control unit and bypass the automatic operation. The push button switch 94 is connected between line 89 and line 92. The push button 94 operates just like the standard control on the Carousel.

The main control for the illuminating lamp, fan and control unit of the slide changer assembly is a main "on-off" switch 95 that is connected through a line 90 to terminal block 72 and through a line 97 to the changer. The other terminal of the changer is connected through a line 98 to the terminal block 70. Likewise, the timing motor 63 is controlled by an "on-off" switch 101 which is connected from the line 102 to the terminal block 72 and by a line 103 to the one contact on the timing motor. The other side of the timing motor is connected through the line 104 back to the terminal block 70.

If desired, manual push button switches illustrated generally at 108 can be utilized for operating the solenoid 23 of the shutter and cutting out the automatic timer. There is one push button for each of the contact arms of the timer. The auomatic circuit is always disconnected when the push buttons 108 are used, either by disconnecting the line 43, disconnecting line 49 or by lifting the finger 52 so it clears the contacts. The circuit will go through line 68, the bearing block and contact pin to covering 59, arm 56, through a line 109, a push button switch and line 110, which connects to line 49 leading to solenoid 23.

The sequence of operation is that a series of slides (up to 80) are put in the magazine 26, one in each of the individual compartments. The main switch is turned on. Then, at a starting point, keyed to a particular contact, a slide is placed in the illumination station 28. The length of time of exposure for the slides is determined either by measuring the density of the slide through instruments or by visual evaluation of the length of time it is necessary to expose the slide properly on the filmstrip film. Then, the line 43 for that contact is attached to the appropriate bus bar 53 so that the proper length of time which the solenoid 23 will be energized is achieved. The two banks of bus bars are used to have room to clip on all the wires 43. There are nine different times for exposure. As shown, for example, saying that the slide in position in the unit requires six second exposure, the line 43 leading from the contact which the finger 52 is touching will be attached to the upper bus bar 53 which is in turn attached to line 54 to the contact arm 56. The contact arm 56 will complete a circuit on the rotating timer roll (asuming motor 63 is operating), for one revolution or approximately six seconds. This circuit will be completed through the jacket or covering 59, a conducting pin to stub shaft 62, bearing block 64, line 68, resistor 69 and back through the terminal block to one side of the 110 volt source.

The circuit is completed through the finger 52 to contact arm 45, spring 46, ball joint 47, bracket 48 and line 49 to one side of the terminal of the solenoid 23. The other terminal of the solenoid 23 is connected through the line 73 to terminal block 72 to complete the circuit to this solenoid when the main switch is on. The length of time that the solenoid is operated is changed merely by attaching the circuit through one of the other contact arms of the timer which will not have a completed circuit for as long a time. Of course, commercially available timed electrical switches can also be used.

Whenever the roll 58 has moved to position so that the contact arm 56 is in the bare spot 65, the solenoid 23 will no longer be energized and the shutter will close. Then the circuits are completed through strips 66 and 67 and their associated contact arms and lines for the film advance and for the slide changer and magazine advance. A new slide will be placed in the illumination station and the finger 52 will advance to the next contact 42. The new slide will also then be properly connected through its contact and line 43 to a bus bar, for example, a bus bar 50, that will complete a circuit to hold the shutter open for less than six seconds, for example, three seconds. The individual programming is done for a complete cycle of slides. One contact 42 is used for each slide and is connected to the proper timer segment. Then when that slide next is placed in the illumination station, the finger 52 will be touching the same contact and the same exposure of the film will result. Once programmed, the exposure selected for each slide will repeat.

The length of exposure of each of the slides is carefully programmed for the desired time when the group of slides is first passed through the slide changer. Once properly programmed the unit is merely turned on and will automatically advance the magazine one slot to a particular slide, open the shutter for the predetermined length of time, allow the shutter to close and then advance the projector and the film in the filmstrip camera once more.

While the device shown controls the exposure of the film in the camera by varying the length of time the camera shutter is open, the exposure control could also be by controlling the size of opening of the lens aperture or by controlling the intensity of the illuminating lamp.

Once the complete set of filmstrips has been produced, the slides are removed from the magazine and stored in proper sequence. The proper exposure setting for each slide is recorded in a log. If additional filmstrips are desired, the slides are placed back in proper order in the magazine and the controls connected as indicated by the previous exposure log. If some slides are to be replaced, then the only slides that have to be reprogrammed are the new slides. This saves a good deal of time and also gives flexibility to the selection of slides used in the filmstrip. The strips can easily be updated or revised slightly. When master units are used to make filmstrips, the master cannot be changed. If any changes are desired, a new, expensive master must be made.

Using the process of the present invention also makes it easy to prepare a test strip for viewing by the person needing the strip and allows him to substitute or add different pictures without destroying the programming of the other slides.

What is claimed is:

1. A device for making filmstrips from images on photographic slides comprising a filmstrip camera having a film therein, first means for advancing the film in the camera one frame in response to an electrical signal, a re-cyclable slide magazine, a slide illuminating device positioned so that a slide in the illuminating device is properly positioned to be photographed by the filmstrip camera, second means to transfer one slide at a time sequentially from said magazine to said slide illuminating device in response to an electrical signal, programming means to independently control the exposure of the film in the filmstrip camera to photograph each slide as it is moved into said illuminating device and repeat the exposure each time the magazine returns to position where in that particular previously programmed slide is in the illuminating device, and means to provide an electrical signal to the first and second means after a slide has been photographed by the filmstrip camera.

2. A device for producing a plurality of identical filmstrips from a preselected number of photographic slides comprising a base, a filmstrip camera having a shutter and film support means thereon mounted on said base, first means to control the exposure of a film in the camera in response to an electrical signal, second means to advance the film in the camera one frame in response to an electrical signal, a slide illuminator assembly comprising a magazine containing the slides from which the filmstrip is to be produced, an illumination station, third means operable in response to an electrical signal to position one slide at a time from the magazine sequentially into the illumination station wherein the slide can be photographed by the filmstrip camera, means to cycle the magazine so each slide sequentially appears at the illumination station a plurality of times thereby to present a repeatable series of exposures on the film in the filmstrip camera, means to illuminate the slides in the illumination station, programming means for providing a separate electrical signal to the first means for each slide in the magazine so that each time a particular slide from the magazine is positioned in the illumination station the slide will receive the same exposure as it did the previous time, and means to provide electrical signals to said second and third means after each slide has been photographed by said filmstrip camera.

3. The combination as specified in claim 2 wherein the second means comprises a solenoid for opening the shutter of the camera when it is energized and the programming means includes timer means for controlling the length of time that the solenoid is energized.

4. The combination as specified in claim 3 wherein the second and third means are actuated simultaneously and when the shutter on the camera is closed.

5. The combination as specified in claim 4 wherein said magazine is a unit rotatable about a vertical axis, a member around the outer periphery thereof, a plurality of contacts on the member and positioned around the outer periphery of the magazine, one contact corresponding to each of the slides in the magazine, and a wiper arm on the magazine adapted to engage a separate, different contact whenever a different slide is in the illumination station, and electrical circuit means leading from each of the contacts through the timer and a source of electromotive force to the solenoid for the shutter of the camera, and electrical circuit means from the wiper arm to the solenoid for the shutter of the camera to complete a circuit to energize the solenoid through the timer.

6. The combination as specified in claim 5 wherein the timer means includes separate sections which will complete an electrical circuit for various lengths of time, and said circuit means having provision for connecting each of the contacts to a single preselected section of the timer to thereby control the preselected length of time the circuit to the solenoid will be completed through each contact.

7. A device for making filmstrips from images on photographic slides comprising a filmstrip camera having a film therein, first means for advancing a film in the camera one frame in response to a predetermined signal, second means for controlling the exposure of the film in the camera, a slide magazine, a slide illuminator positioned so that slides in the illuminator will be photographed by said camera upon operation of said second means, third means to transfer one slide at a time sequentially from said magazine to said slide illuminator each time it receives a signal, and means operable to cycle the magazine so each slide therein is transferred to the slide illuminator a plurality of times, programming means connected to the second means and including exposure adjustment means to separately select the exposure value for each slide in the magazine and operable to repeat the exposure of each slide in said magazine whenever it is positioned in said illuminator, and means to provide signals to said first and third means after the film in the camera has been exposed to capture the image from each slide in the illuminator.

8. The device of claim 7 wherein said slide magazine is a unit rotatable about an axis, a member adjacent the outer periphery of said magazine, cooperating means between said magazine and said member providing a separate indication signal when each slide in the magazine is positioned in the slide illuminator, and means connecting said indication signal to said exposure adjustment means.

9. The device of claim 8 wherein said cooperating means comprise electrical contact means completing a separate circuit whenever a different one of said slides is in the illuminator section.

10. The device of claim 9 wherein said exposure adjustment means includes timer means for separately selecting the exposure time for each of the slides in the magazine.

References Cited

UNITED STATES PATENTS 3,354,804  11/1967  Jones _____ 88—24 X

NORTON ANSHER, *Primary Examiner.*

RICHARD A. WINTERCORN, *Assistant Examiner.*